United States Patent [19]

Nagy

[11] 4,286,253
[45] Aug. 25, 1981

[54] TIRE PRESSURE SENSING AND ALARM SYSTEM

[76] Inventor: Emery J. Nagy, Rte. 1, Box 86, Yoncalla, Oreg. 97499

[21] Appl. No.: 69,564

[22] Filed: Aug. 24, 1979

[51] Int. Cl.³ .............................................. B60C 23/02
[52] U.S. Cl. .................................... 340/58; 200/61.25
[58] Field of Search .............. 340/58, 539; 200/61.22, 200/61.25

[56] References Cited

U.S. PATENT DOCUMENTS

| | | | |
|---|---|---|---|
| 2,727,221 | 12/1955 | Sprigg | 340/58 |
| 3,588,815 | 6/1971 | Koonce | 340/58 |
| 3,697,944 | 10/1972 | Murano | 340/58 |
| 4,048,614 | 9/1977 | Shumway | 340/58 |

Primary Examiner—Alvin H. Waring
Attorney, Agent, or Firm—Klarquist, Sparkman, Campbell, Leigh, Whinston & Dellett

[57] ABSTRACT

A tire pressure sensing and alarm system having a sensor for each wheel of a vehicle, emitting an rf alarm signal upon sensing low pressure, and a receiver in the driver's compartment to give a visual and/or audible alarm upon receipt of the signal. The sensor has a pressure responsive piston and an adjustably positioned switch to be actuated by the piston.

3 Claims, 5 Drawing Figures

U.S. Patent     Aug. 25, 1981     4,286,253
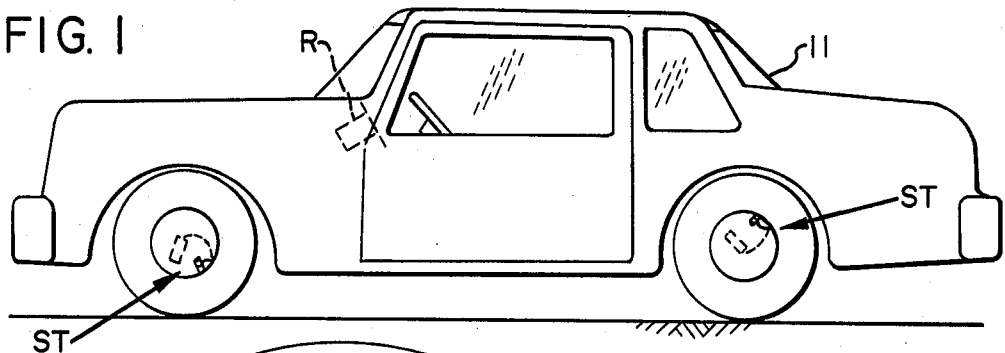
FIG. 1
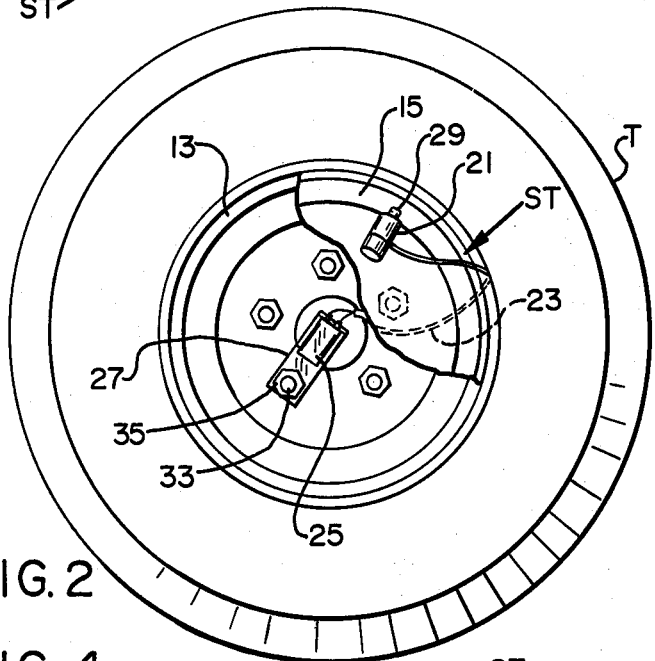
FIG. 2
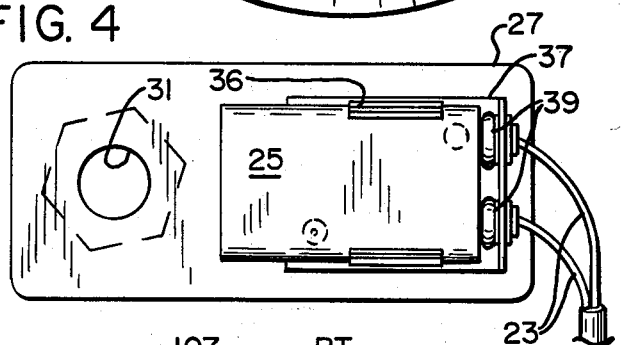
FIG. 4
FIG. 5
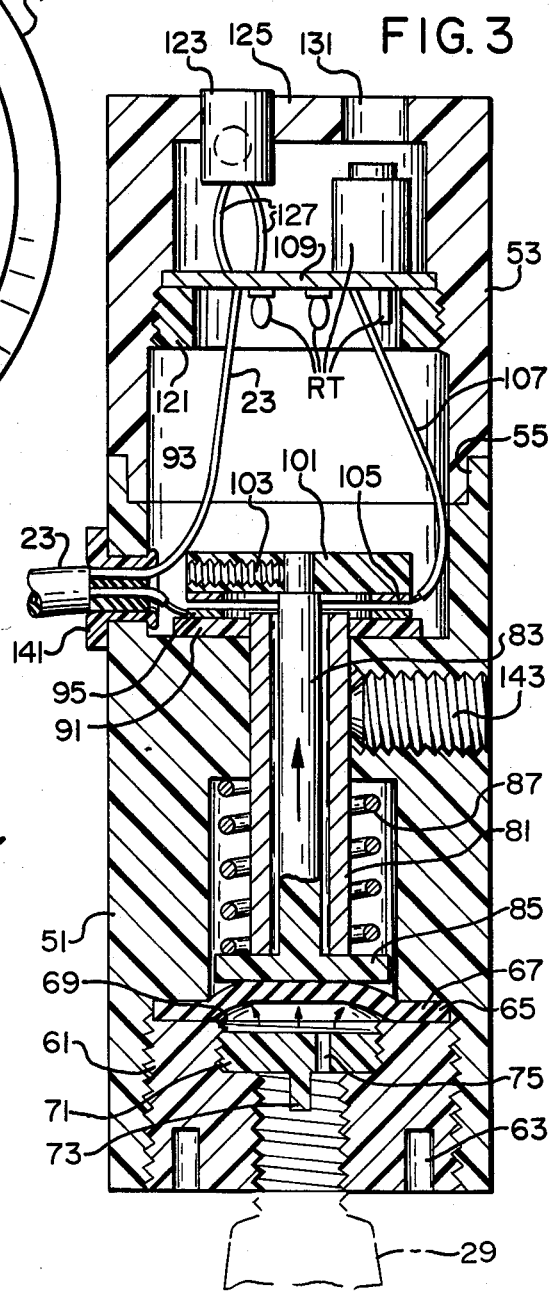
FIG. 3

TIRE PRESSURE SENSING AND ALARM SYSTEM

FIELD OF THE INVENTION

The present invention relates to a tire pressure indicating system and to a tire pressure sensor.

BACKGROUND OF THE INVENTION

It has been common practice for decades to rely merely on visual inspection of the condition of a tire to determine when the pressure becomes too low. Sometimes, the conclusion drawn from the visual inspection has been erroneous. Other times, the driver or the filling station attendant forgets to check the tire condition.

The result of these erroneous conclusions or check failures has led to riding on improperly inflated tires, which greatly increases wear and makes the vehicle not as responsive, under emergency conditions, as with properly inflated tires.

In recent years, pressure signal attachments have been devised which are mountable on valve stems of tires to signal when the tire pressure is too low. However, again, forgetfulness to check, leads to the same problems as above described. In addition, there are different pressure requirements for the front and rear wheels of a vehicle, between large tires and small ones, between tires on heavy vehicles versus light ones, etc. This has required the availability of different attachments for different circumstances.

SUMMARY OF THE INVENTION

The present invention overcomes the above problems by providing a tire pressure sensing and alarm system by which an alarm on or near the dashboard will give a visual and/or audible signal whenever the pressure of any of the vehicle tires becomes too low.

More particularly, the present invention provides a small radio transmitter on each wheel which is actuated by a tire pressure sensor upon sensing low pressure, to issue an alarm signal which is picked up by a receiver on or near the dashboard to give the required alarm.

The invention further contemplates a pressure sensor mountable on the valve stem of a tire and adjustable so as to be responsive to a pressure which is a predetermined percentage or amount below any of a number of selected pressures.

The invention further contemplates a system wherein the actuated sensor gives a visual signal of its condition so that the driver can readily determine which tire has low pressure.

The subject matter which I regard as my invention is particularly pointed out and distinctly claimed in the concluding portion of this specification. The invention, however, both as to organization and method of operation, together with further advantages and objects thereof, may be best understood by reference to the following description, taken in connection with the following drawings, wherein like reference characters refer to like elements.

BRIEF DESCRIPTION OF THE DRAWINGS

FIG. 1 is a schematic view of a passenger vehicle showing a pressure sensing system of the present invention applied to the vehicle;

FIG. 2 is an enlarged view of one of the wheels better showing certain components of my system;

FIG. 3 is an enlarged midsectional view through the pressure sensing and transmitting capsule;

FIG. 4 is an enlarged view of the battery and its mounting plate;

FIG. 5 is a circuit diagram of part of the system.

Referring to FIG. 1, the passenger vehicle 11 having a tire pressure sensing system of the present invention, includes a tire pressure sensing and transmitting assembly ST on each of the vehicle wheels, FIG. 1 showing the near side ones. R indicates a receiving device.

In FIG. 2, the pressure sensing and transmitting assembly ST is better shown, with the tire being indicated at T, the wheel rim at 13 and the hub cap at 15.

The components of my sensing and transmitting assembly comprise a sensing and transmitting capsule 21 threadedly mounted on a valve stem 22 of the tire T (FIGS. 2 and 3) connected by electrical conductors 23 to a battery 25 carried by a battery supporting plate 27. The battery plate 27 has a hole 31 to receive one of the wheel studs 33 to enable the battery plate to be mounted by means of one of the wheel stud bolts 35.

FIG. 4 shows a battery being detachably held in place by a pair of strong clips 36, the clips being carried by a mounting bracket plate 37 fixed to plate 27. Bracket plate 37 carries a pair of contacts 39 for engagement with the two contacts of the battery. Conductors 23 lead from the battery of FIG. 4 to the capsule best shown in FIG. 3.

The capsule can be formed in any of a number of ways but preferably I have shown it as fabricated from plastic parts, including a cylindrical lower sensing body section 51 and an upper transmitting section 53, threaded or otherwise suitably connected to one another at a joint 55. The lower body section 51 threadedly receives a threaded plug 61 which itself has an internally threaded bore to threadedly receive the tire valve stem 22. Spanner holes 63 or other convenient means are provided on the plug 61 to enable it to be threaded into place to clamp the margins of an elastomer diaphragm 65 in sealing engagement with an internal shoulder 67 formed in the body section 51.

FIG. 3 shows that the plug 61 has a shallow internally threaded recess at 69 to threadedly receive a disc 71 having a prong 73 for depressing the movable core (not shown) of the valve stem. The disc has a hole 75 to allow the air to pass through the disc so that the air pressure of the tire is effective against the diaphragm 67.

Slidably fitting within the upper portion of the lower body section 51 is a sleeve 81. Slidably disposed within this sleeve is the shank or stem 83 of a plunger or piston having a head 85 pressed into contact with the diaphragm by a compression spring 87 housed within a bore in the lower body section.

The upper end of the sleeve 81 carries an insulating washer 91 disposed above the bottom wall of a recess 93 formed in the upper portion of the lower body section. The washer 91 carries a ring type fixed electrical contact 95, which is itself connected to one of the conductors 23. The upper end of the shank or stem 83 of the plunger carries an insulating disc 101 secured in place by setscrew 10 and carrying a second or movable contact 105 which is electrically connected to a conductor 107. The other end of conductor 107 is connected to a circuit board 109 held in place against a shoulder on the upper body section 53 by a nut 121.

The circuit board is provided with a small radio transmitter for transmitting rf energy to be picked up by the receiver R. Details of this radio transmitter are not shown since they can be of usual and customary construction. I have indicated generally certain of its parts by the designation RT. There is a light emitting diode 123 mounted in the end wall 125 of the upper body portion. It is connected by leads 127 into the circuitry of the radio transmitter. When the radio transmitter is transmitting, the diode 123 will be energized and thus lit, so that when the operator receives a signal he can determine by inspection of the wheels which tire has sent the signal. A hole 131 is provided to facilitate adjustment of the frequency of the transmitter, but typically will be later sealed after the desired frequency has been set.

For simplicity in disclosure, the conductors 23 are shown as extending through a ferrule 141 into the capsule. In practice, a separable electrical connection will be provided at the ferrule so that the conductor 23 separates at the ferrule into a removable male fitting fitting in a female fitting on the ferrule.

A unique feature of the present invention is the ability of the capsule to adapt itself to a wide range of pressures of various tires. To achieve this purpose, a setscrew 143 is provided and threadedly received by the lower body section 51 and can be turned so as to clamp the sleeve 81 against movement. However, when initially applying the capsule 21 to a tire, the setscrew 143 will be backed off allowing normal tire pressure to shift the plunger head 85 upwardly, carrying the sleeve 81 with it a distance as determined by the relative pressures on the opposite sides of the diaphragm 65. Then, the setscrew 143 is threaded inwardly so that the contacts 95 and 105 are now separated a desired distance. Should the pressure in the tire drop a predetermined percentage, say, for instance, 5%, the pressure on the lower side of the diaphragm 65 will decrease accordingly, allowing the spring 87 to force the plunger downwardly to cause engagement between the contacts 95 and 105 and thus causing energization of the radio transmitter RT. This signal will be picked up by the receiver R which gives a signal, either visual or audible, or both, to the driver. The driver will then inspect the various capsules to determine which one has sent the signal, by examining them, the one sending the signal having its diode 123 lit and thus giving a visual signal to the driver.

FIG. 5 is a simplified circuit diagram where one of the conductors 23 is assumed to be connected to the stationary contact 95, the conductor leading to the battery 25. The movable conductor 105 is connected by conductor 107 to the radio transmitter RT.

What is claimed is:
1. A tire pressure sensor comprising:
a body,
means for mounting the body on the valve stem of a tire,
a pressure sensing piston mounted in said body to react to the pressure of the tire,
alarm switch means to be actuated by the piston,
mounting means mounting said switch means in various positions of adjustment relative to said body to adapt said switch means to be actuated at different levels of piston movement, said mounting means includes a sleeve through which said piston extends,
means mounting said sleeve for sliding movement in said body,
and means for releasably fixing the position of said sleeve and being accessible from the exterior of said body.
2. A tire pressure sensor comprising:
a body,
means for mounting the body on the valve stem of a tire,
a pressure sensing piston mounted in said body to react to the pressure of the tire,
alarm switch means to be actuated by the piston,
said piston having a range of initial positions depending on the pressure in the tire,
said switch means including a first contact carried by said piston to occupy a range of initial positions corresponding to those of said piston,
said switch means including a second contact,
means responsive to the pressure in the tire to move said second contact to a range of initial positions depending on the tire pressure whereby the switch means adjusts its initial position depending on the tire pressure.
3. A tire pressure sensor comprising:
a sensor body,
means mounting said body on the valve stem of a tire,
a diaphragm in said body exposed to the pressure of the tire and deforming in response thereto,
a first member movable by said diaphragm and carrying a switch contact,
a second member movably mounted in said body, movable by said diaphragm, and carrying a second switch contact,
and means for selectively fixedly holding the second member in any of a range of different positions.

* * * * *